US010949201B2

(12) United States Patent
Bingham et al.

(10) Patent No.: US 10,949,201 B2
(45) Date of Patent: Mar. 16, 2021

(54) PROCESSOR WITH ACCELERATED LOCK INSTRUCTION OPERATION

(71) Applicant: Advanced Micro Devices, Inc., Santa Clara, CA (US)

(72) Inventors: Scott Thomas Bingham, Santa Clara, CA (US); Marius Evers, Santa Clara, CA (US); Krishnan V. Ramani, Santa Clara, CA (US); Thomas Kunjan, Sunnyvale, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 3 days.

(21) Appl. No.: 16/286,702

(22) Filed: Feb. 27, 2019

(65) Prior Publication Data

US 2020/0272463 A1 Aug. 27, 2020

(51) Int. Cl.

*G06F 9/30* (2018.01)
*G06F 12/0875* (2016.01)
*G06F 12/0815* (2016.01)

(52) U.S. Cl.

CPC ........ *G06F 9/3009* (2013.01); *G06F 9/30043* (2013.01); *G06F 12/0875* (2013.01); *G06F 12/0815* (2013.01); *G06F 2212/452* (2013.01)

(58) Field of Classification Search

CPC ......................... G06F 12/0815; G06F 9/30043
See application file for complete search history.

(56) References Cited

U.S. PATENT DOCUMENTS

2004/0123058 A1* 6/2004 Hum .................. G06F 9/30087 711/163
2004/0193844 A1* 9/2004 Thimmannagari ... G06F 9/3838 712/209
2011/0307689 A1* 12/2011 Chung ................. G06F 9/3004 712/234
2018/0074977 A1* 3/2018 Smaus .................. G06F 9/528

* cited by examiner

*Primary Examiner* — Zachary K Huson
(74) *Attorney, Agent, or Firm* — Faegre Drinker Biddle & Reath LLP

(57) ABSTRACT

A processor and method for handling lock instructions identifies which of a plurality of older store instructions relative to a current lock instruction are able to be locked. The method and processor lock the identified older store instructions as an atomic group with the current lock instruction. The method and processor negatively acknowledge probes until all of the older store instructions in the atomic group have written to cache memory. In some implementations, an atomic grouping unit issues an indication to lock identified older store instructions that are retired and lockable, and in some implementations, also issues an indication to lock older stores that are determined to be lockable that are non-retired.

18 Claims, 8 Drawing Sheets

PROCESSOR WITH ACCELERATED LOCK INSTRUCTION OPERATION

BACKGROUND OF THE DISCLOSURE

Processors often include multiple processing cores and each of the cores execute instructions. A set of instructions are sometimes referred to as threads. A lock instruction is a type of instruction that reads data from memory, modifies that data, and stores that data back to memory. A lock instruction has an atomic property and a fencing property. The atomic property prevents modifications to the memory address associated with the load instruction from occurring between the time that the lock instruction begins and the time the lock instruction ends. The fencing property says that all memory accesses "older" (before, in program order) than the lock instruction must complete before memory accesses after the lock instruction are allowed to complete. Strict application of these properties can result in processor slowdowns due to delays associated with requiring the lock instruction and younger instructions to wait for older instructions to complete. Uncontested locks can suffer long repeat rates due to having to complete serially.

BRIEF DESCRIPTION OF THE DRAWINGS

The implementations will be more readily understood in view of the following description when accompanied by the below figures, wherein like reference numerals represent like elements, and wherein.

DETAILED DESCRIPTION OF IMPLEMENTATIONS

Figure 1:
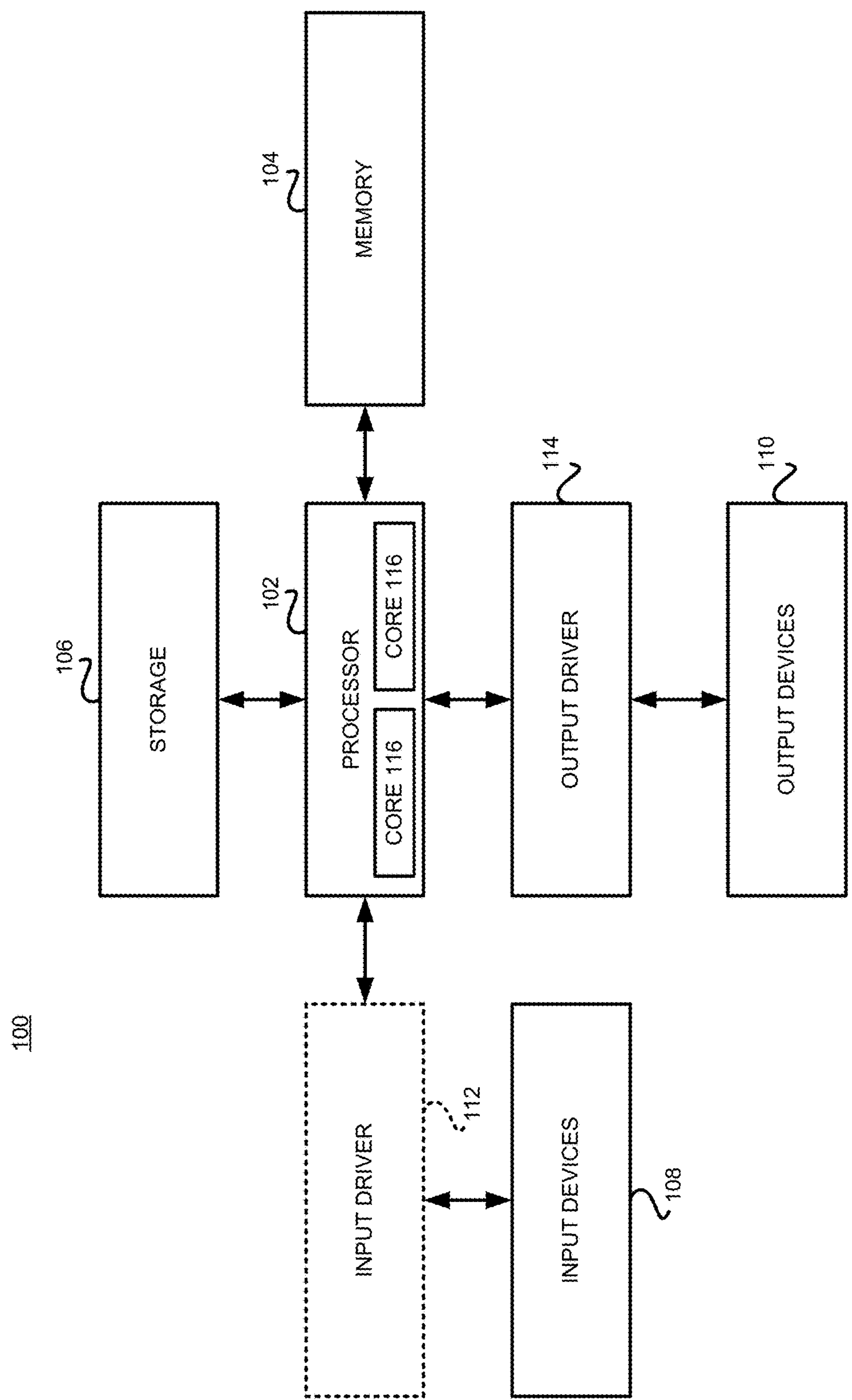
FIG. 1 is a block diagram of a device in which aspects of the present disclosure are implemented.

In some implementations, a processor speeds up execution of cacheable lock instructions (where the lock data is stored in caches) when the fencing and ordering properties of a lock are satisfied, except for completion of older store instructions. If older store instructions are also in a state that allows their cache line to be locked in the cache, then the mechanism simultaneously locks the older stores in the cache as well as the cache line associated with the lock instruction thereby creating an atomic group of older stores. By creating the atomic group, the cache lock can be completed speculatively and an outside observer, such as another thread or core, cannot tell if the lock was completed speculatively (it cannot observe instructions execution out of order). The lock does not have to wait for older stores to actually write to memory.

In some implementations, a processor and method for handling lock instructions identifies which of a plurality of older store instructions relative to a current lock instruction are able to be locked. The method and processor lock the identified older store instructions as an atomic group with the current lock instruction. The method and processor negatively acknowledge probes until all of the older store instructions in the atomic group have written to cache memory. In some implementations, an atomic grouping unit issues an indication to lock identified older store instructions that are retired and lockable, and in some implementations, also issues an indication to lock older stores that are determined to be lockable that are not retired.

In some implementations, the processor includes an atomic grouping unit, and probe processing logic wherein the probe processing logic negatively acknowledges probes until all of the older store instructions in the atomic group have written to cache memory. In some implementations, the probe processing logic includes a post retire store queue unit (also referred to as a store coalescing buffer (SCB)) that manages stores that have been retired. In other implementations, the probe processing logic includes a store queue unit (STQ). The store queue unit contains non-retired, and possibly retired, older stores determined to be lockable. The atomic grouping unit issues an indication to either or both of: the store queue unit to lock the identified older stores that are non-retired that are lockable and/or an indication to lock the retired stores in the post retire store queue unit (or store queue unit) that are retired and determined to be lockable.

In some implementations, the atomic grouping unit identifies which of the plurality of older store instructions relative to a current lock instruction are able to be locked based on a number of differing criteria. For example, when the older store instructions are in the post retire store queue unit, the criteria includes cache coherency state information indicating that the older store instructions are writeable (such as being E-exclusive and M-modified). This may be obtained from a cache tag array. Additional criteria includes information that the older store instructions are cacheable store instructions and that no state changes are in flight due to probes from other cores. In addition or instead of this criteria, in some implementations, the atomic grouping unit identifies which store instructions are older based on an age mask. From the age mask it is known which stores to consider for determining if an atomic group can be formed.

FIG. 1 is a block diagram of an example device 100 in which aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 may also optionally include an input driver 112 and an output driver 114. It is understood that the device 100 may include additional components not shown in FIG. 1.

The processor 102 includes multiple cores 116. In one example, each core 116 is a central processing unit (CPU). In other examples, each core 116 is one of a central processing unit (CPU) or a graphics processing unit (GPU).

The multiple cores 116 execute independent workloads that have the ability to coordinate through memory mechanisms and through coherence mechanisms. The memory 104 may be located on the same die as the processor 102 or may be located separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108 and permits the processor 102 to receive input from the input devices 108. The output driver 114 communicates with the processor 102 and the output devices 110 and permits the processor 102 to send output to the output devices 110. It is noted that the input driver 112 and the output driver 114 are optional components, and that the device 100 will operate in the same manner if the input driver 112 and the output driver 114 are not present.

Figure 2:
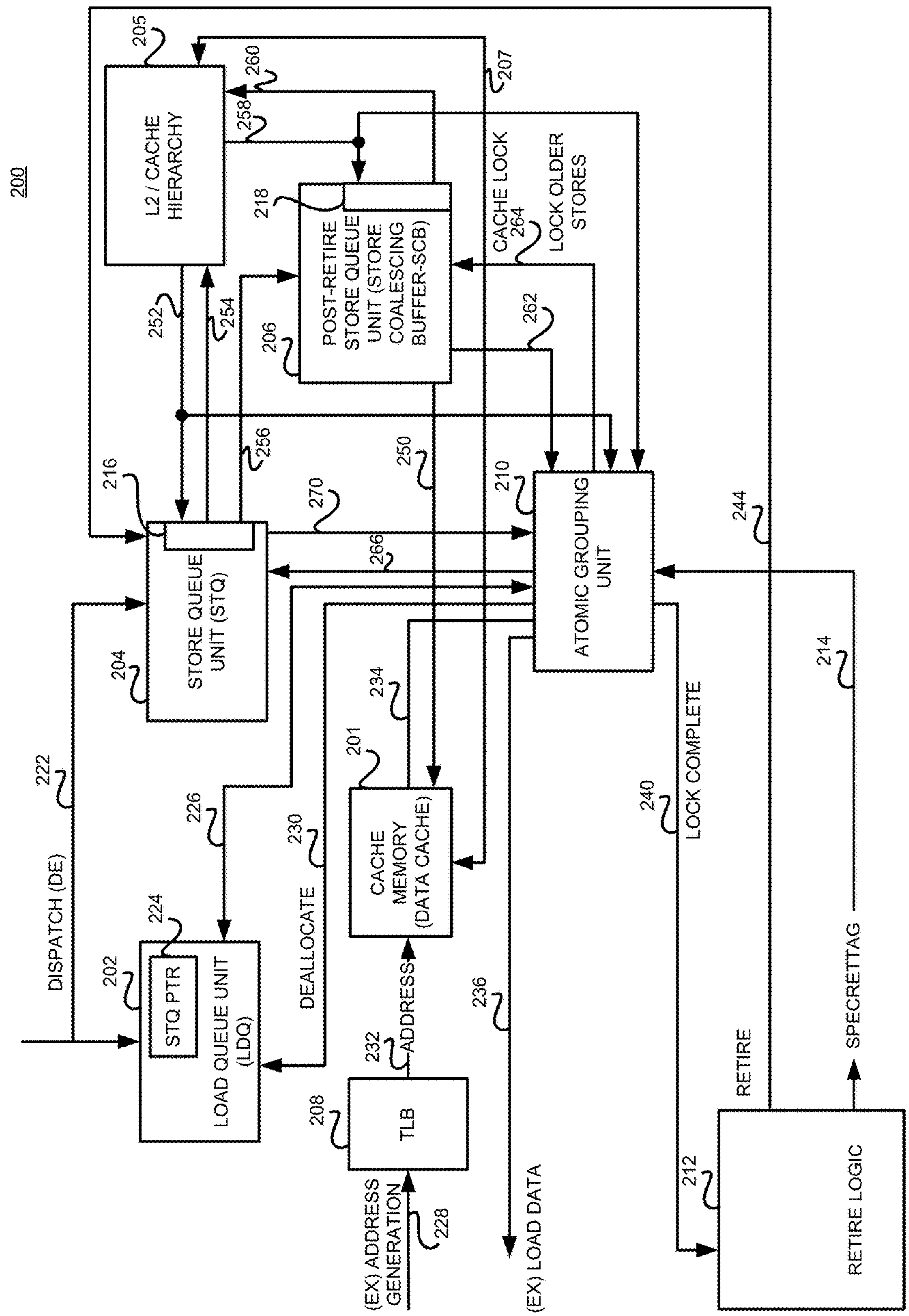
FIG. 2 is a block diagram illustrating one example of a processor that employs an atomic grouping unit in accordance with aspects set forth in the disclosure.

FIG. 2 is a block diagram of a portion of a load/store unit 200, included within a core 116 of the processor 102 of FIG. 1, according to an example. Not shown is an instruction execution pipeline that has an execution unit (EX) and dispatch unit (DE) that retrieves instructions from memory, executes the instructions and modifies the state of elements within the instruction execution pipeline, such as registers within a register file.

The instruction execution pipeline as known in the art includes an instruction fetch unit to fetch instructions from system memory (such as memory 104) via an instruction cache, a decoder to decode fetched instructions, functional units to perform calculations to process the instructions, the load/store unit 200 loads data from or stores data to system memory via a data cache 201, and a register file which includes registers that store working data for the instructions.

The load/store unit 200 includes a load queue unit 202, a store queue unit 204, a post retire store queue unit 206 (also referenced to as a store coalescing buffer SCB 206) is implemented as part of a load status pipeline. These queues are present to ensure that load instructions and store instructions appear to software to execute in order while also providing the processor 102 the freedom and associated processing speedups with actually executing these instructions out of order. The load/store unit 200 also includes a translation lookaside buffer (TLB) 208, an atomic grouping unit 210 and is in communication with retire logic 212 that in this example is inside of the EX stage. In one example, the retire logic 212 facilitates speculative lock management and issues a speculative retirement tag 214 as further described below. For a speculative lock, a lock instruction and younger instructions are allowed to speculatively retire prior to the store portion of the lock instruction committing its value to memory. These instructions thus do not have to wait for the lock instruction to complete before retiring. In the event that the processor detects a violation of the atomic or fencing properties of the lock instruction prior to committing the value of the lock instruction, the processor rolls back state and executes the lock instruction in a slow mode in which younger instructions are not allowed to execute until the stored value of the lock instruction is committed. Speculative retirement of these instructions can result in increased processing speed, as instructions no longer need to wait to retire until after the stored value of the lock instruction is committed. However, the retire logic 212 need not provide such speculative lock operation and conventional retire logic may be employed.

More specifically, when a load or store instruction arrives at the load/store unit 200 and is otherwise ready to execute, the load/store unit 200 executes such instruction, regardless of program order. This execution occurs even though the potentially out-of-order execution means that a particular loaded value can become stale between the time that the load instruction is executed and the time that the load instruction is ready to retire due to being the oldest instruction in a reorder buffer.

More specifically, upon execution, the loaded value is retrieved and sits in a renamed register within a register file until the load instruction retires. Once the load instruction retires, the loaded value becomes the "canonical" value, sitting in a register deemed to be the architectural register.

To execute the load instruction, the load/store unit 200 retrieves a particular value from memory unless the STQ 204 includes an indication of an older store instruction that stores to the same memory address as the load instruction. In that instance, the load instruction retrieves the value to be stored by such store instruction from the register indicated as the source for that store instruction (i.e., the renamed register holding the data to be stored).

Store instructions to the same address as the load instruction that are older than the load instruction but that nevertheless execute after the load instruction update the value of the load instruction. More specifically, upon execution of a store instruction, the processor 102 checks the load queue unit 202 to find younger load instructions that load from the same memory address as the store instruction. The processor 102 flushes the load instruction and also flushes all instructions younger than the load instruction, causing those instructions to re-execute. Any instructions dependent on the now-updated load instruction re-execute based on the updated value. Because of the new value from the store instruction, the re-executed load instruction "sees" the correct value from that store instruction.

A load instruction is considered to be pending (not yet retired) until the loaded value is written to an architectural register. Thus, load instructions are pending until retirement. Store instructions, on the other hand, are considered pending past the point at which the store instructions retire. More specifically, store instructions are issued, executed by the load/store unit 200, and retire when the load/store unit 200 issues the stored value to memory to be written. However, the value to be stored is not yet written to memory at that point due to memory access latency. The act of actually writing the value to memory is called "committing" the store instruction.

To ensure committing of store values in program order, the load/store unit 200 maintains the store instructions in the SCB 206 in program order. Values at the head of the queue are considered to be the oldest stores ready to be committed and are committed to memory at that point. Values cannot be committed to memory if the values are not at the head of the SCB 206. When a value for a store instruction is written to memory (typically to a cache such as data cache 201), the store instruction is removed from the SCB 206. At this point, the store instruction is considered to be no longer pending.

Lock instructions are instructions that include a load component, an "op" (operation) component, and a store component. More specifically, a lock instruction reads data from a memory address, modifies that data according to a specified operation, and writes the modified data back to the memory address. Lock instructions have both an atomic property and a fencing property. The atomic property means that in between the time the lock instruction reads the data and the time instruction writes the data, no stores can be made to the memory address specified by the lock instruction. The fencing property means that the lock instruction waits for all older loads to complete and stores to commit within the same thread as the lock instruction before executing and all loads and stores younger than the lock instruction within the same thread as the lock instruction wait for the lock instruction to complete before execution.

Strict application of the above two properties leads to significant slowdowns in processor execution related to the need to stall instructions that are either dependent on or younger than the lock instruction. In contrast to prior processing designs, the atomic grouping unit 210 causes older stores relative to a lock instruction to be grouped atomically.

Generally, the lock fences operations on the same thread. They cannot be observed to pass or be passed by the lock. There are normal mechanisms for same thread load-load, store-store, load-store and store-load that enforce ordering rules on the same thread that apply regardless of the lock property. The atomic property is an inter-thread/system statement. No writes to the address from another thread can be allowed/observed to happen between the load and store of the lock.

Figure 3:
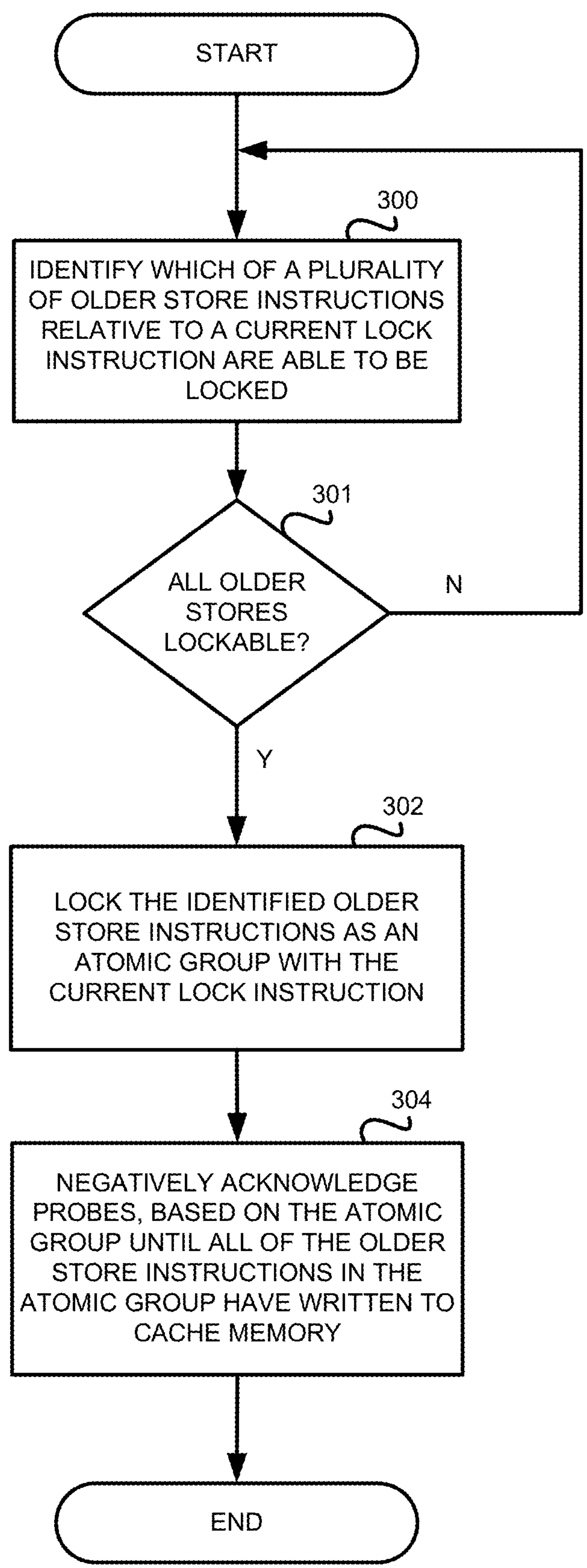
FIG. 3 is a flowchart illustrating one example of a method for handling lock instructions in accordance with one example set forth in the disclosure.

Referring also to FIG. 3 which is a flowchart illustrating a method for handling a lock instruction, the atomic grouping unit 210 identifies which of a plurality of older store instructions, relative to a current lock instruction, are able to be locked as shown in block 300. As shown in block 301, if all older stores are lockable, the method proceeds to block 302, otherwise the method returns to block 300. The atomic grouping unit 210 locks the identified older store instruction as an atomic group with the current lock instruction as shown in block 302. Probe processing logic 216 and 218 may be integrated as part of the STQ 204 and SCB 206 respectively, or in any other suitable manner. As shown in block 304, the probe processing logic (216 and/or 218) negatively acknowledges probes from other cores executing other threads, based on the atomic grouping of the older store instructions, until all of the older store instructions in the atomic group have written to cache memory 201. It will be recognized that the probe processing logic 218 may be the only probe processing logic needed if all store instructions are in a post retire mode. The probe processing logic 216 is employed when the STQ 204 includes older store instructions that have been deemed lockable and are part of the atomic group but are not yet allocated to the SCB 206 as being retired.

Figure 4:
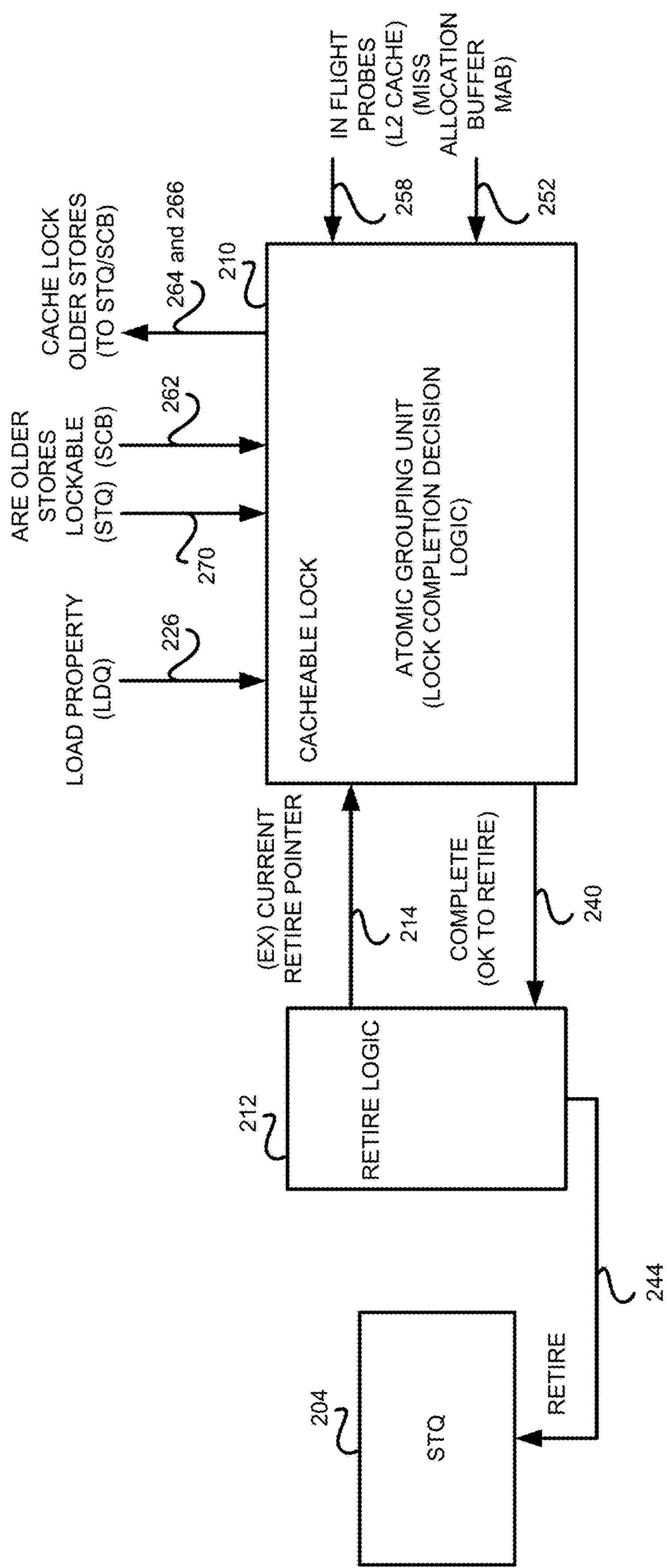
FIG. 4 is a block diagram illustrating one example of an atomic grouping unit in accordance with one aspect of the disclosure.
Figure 6:
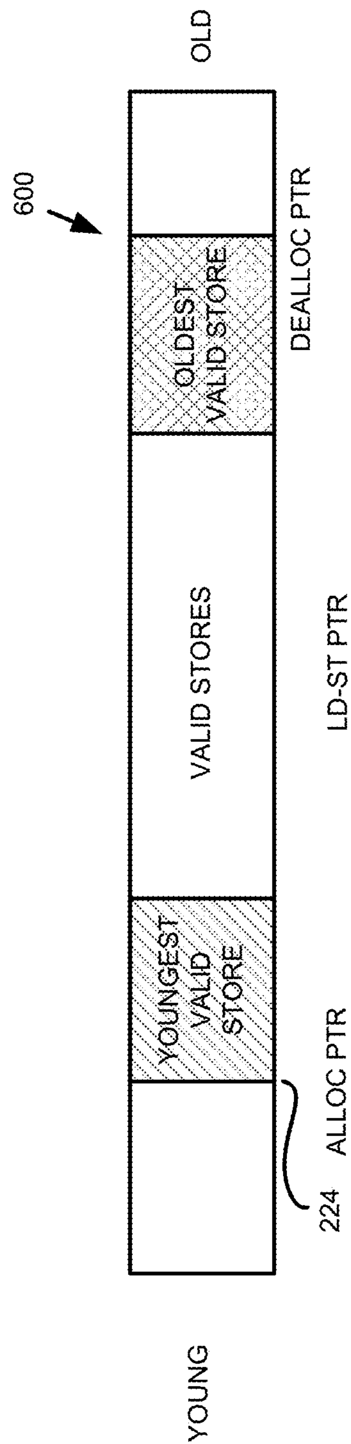
FIG. 6 is a diagram illustrating an example of a circular FIFO queue storing store entries associated with the store instruction.

Referring to FIGS. 2, 4, and 6, operation of the load/store unit 200 will be described. Loads/stores/locks are dispatched 222 from DE to LDQ (loads) 202 and STQ (stores) 204. Lock instructions are a Load-Store pair and are dispatched to both LDQ 202 and STQ 204. Load instructions store a pointer 224 (when referring to a load or store performing an operation, it is understood to mean that the pipeline circuits are performing the operation) to the youngest older store (the allocation pointer 224 (see FIG. 6) of STQ 204 at dispatch time) so an age mask can be determined. Processing the load instructions also causes the storing of a retire queue pointer so lock instructions can determine their own age relative to other instructions in the machine. The atomic grouping unit identifies which store instructions are older based on the age mask. This can be determined from a load-store pointer and STQ FIFO deallocation pointer math/masks (as well known in the art) or through a retire tag compare. From the age mask it is known which stores to consider for determining if an atomic group can be formed.

The load queue unit 202 stores dispatch payload 226 (and address payload after address generation flow). This information, particularly the load's STQ pointer 224 and retire queue pointer is read from LDQ 202 and issued into the load data/status pipeline and used by atomic grouping unit 210 to determine properties about the locked instruction.

When the locked load has completed the atomic grouping logic 210 will signal 230 to the LDQ 202 that the corresponding entry can be deallocated. This includes a pointer to the LDQ entry and status/control signals. An effective address is sent from address generation units (AGU) in EX to load data/status pipelines which then is translated 232 by translation lookaside buffer (TLB) 208 and sent to the data cache tag array. Cacheability information also comes from the TLB as determined by the memory type of the instruction combined with dispatch payload information about the type of load/store instruction as known in the art, which with the data cache tag array produces cache coherency state information and tag match information 234 for the atomic grouping unit and status pipeline.

In parallel the data cache 201 array is accessed and can return locked load data 236 to EX for consuming instructions. Also, data is returned and the lock is completed. If the lock is able to execute and complete 240, the atomic grouping unit 210 sends exception status, the retire pointer, data status to EX. All load/store ops do the same, including the older stores that the lock instruction is to be atomically grouped with by the atomic grouping unit 210.

The retire logic 212 in EX sends an indication 244 of which stores have been retired to STQ 204 so that the STQ 204 can then deallocate those stores to the SCB 206. This includes the store part of the lock instruction. Not shown is the sending of store data from EX to STQ 204.

The retire logic 212 in EX sends the pointer of the next instruction/op to be considered for retirement 214. The data/status pipeline for the lock instruction lock uses this to resolve serialization requirements in some circumstances. For example, for a lock to complete non-speculatively, its retire tag, stored in the load queue unit 202 and read at issue, must match the current retire tag and all older stores must be committed to memory. Because the retire tag of every dispatched load/store is unique, only one operation may be considered non-speculative at a time. Committing stores from SCB 206 to L1 cache requires sending address information such as cache index and way of L1 to be written, as well as store data, as shown by line 250.

Probes 252 from the L2 cache 205 send address and probe type/control information to the STQ 204. In practice this may include a look up of the data cache tag first so that the address to be compared with in the STQ 204 is L1 index+way instead of the full address. Fill responses that may evict the cache line locked by the STQ 204 will also look up the STQ 204 for matches.

If there is a match between the L1 index+way that the probe/eviction is targeting, a negative acknowledgement (NACK) 254 will be sent by processing logic 216 back to the L2 cache 205 in response which indicates that it was unsuccessful and must be retried by the L2 cache 205. The same occurs for SCB 206. For example, probes 258 from the L2 cache 205 to the SCB 206 similar to probes 252, are NACKed. The SCB 206 locks look for matches. If there is a match, processing logic 218 sends a NACK 260 to the probe. Arrow 207 represents communication flow from the L2 cache 205 to the cache memory 201.

The STQ 204 deallocates stores 256 from STQ 204 to SCB 206 after retirement by transferring some payload information such as address, cache state, locked property and data. Because all SCB 206 entries are retired, they are older and therefore the indication 262 that the stores are lockable is sent directly to the atomic grouping unit 210 without age mask based dynamic lookup. If atomic grouping is successful because of the lock state and states of all older stores, an indication 264 is sent to the SCB 206 to lock older stores.

If desired, an age mask of older stores in the STQ 204 is used to identify which older stores in the STQ 204 can be locked. Once determined, an indication 266 is sent to the STQ 204 to lock older non-retired or retired stores. There is a temporal and SCB queue capacity component to moving from STQ to SCB; a retired store may sit in the STQ for some short amount of time before deallocating STQ and allocating to the SCB. Also, the load's store pointer and some dispatch payload information is sent from the atomic grouping unit/pipeline to create the age mask of older stores to check for locking eligibility. A response 270 to the query of STQ 204 as to whether all older store are lockable is provided to the SCB 206. Requests from load pipeline to a miss allocation buffer (MAB) (not shown) to the L2 cache 205 for write permission is also performed as known in the art. The response goes from the L2 cache 205 to MAB to data cache 201.

The atomic grouping unit 210 also takes in information about in flight probes/evictions 252 and 258 from other cores via the L2 cache 205/MAB and delays creating an atomic group if the probes/evictions would cause loss of a writeable cache state for the stores and lock being considered for the atomic group if it is not able to create a NACK in time. It will be recognized that other structures may also be employed. For example, the post-retire store queue need not be employed and instead the post retire stores could be held in the STQ.

Figure 5:
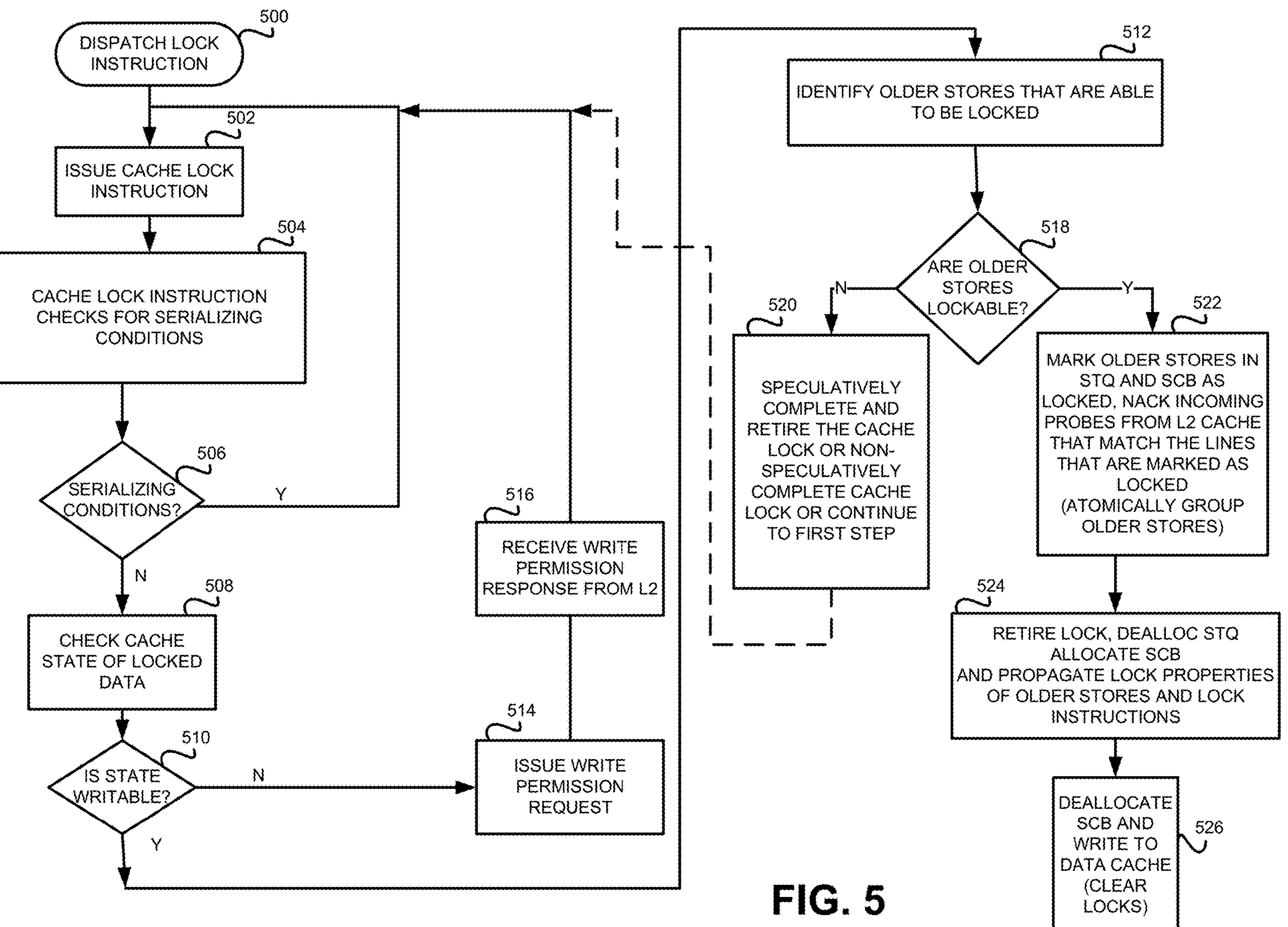
FIG. 5 is a flowchart illustrating one example of a method for handling lock instructions in accordance with one example set forth in the disclosure.

FIG. 5 illustrates a method for atomically grouping lock instructions and older stores. As shown in block 500, a lock is dispatched from the dispatch unit with instruction payload information. The dispatches are in program order. As shown in block 502, the lock instruction is issued first time after dispatch from execution unit (EX) with address generation. Subsequent issues/flows/picks are from the LDQ 202. The LDQ 202 provides dispatch payload and address payload information. As shown in block 504, the lock instruction flows down a load data/status pipeline and using payload information and relative age versus other load queue entries, the pipeline determines how speculatively it can execute the lock based on restrictions as known in the art. In other words, if the lock needs to be serially processed. If the conditions indicate that it should be processed serially as shown in block 506, the process waits for older stores, another lock instruction or other serially required operations to be carried out. For example, the pipeline may have to wait for older loads to execute or it may have to wait for all older instructions to execute or it may be eligible to execute right now. The lock can determine its age relative to other LDQ entries in a variety of ways. The lock can determine whether it is the nonspeculative/oldest unretired instruction by means of a retire queue pointer. Because the LDQ 202 stored the retire pointer of the lock when dispatched, if the retire tag of the load matches the current retire queue pointer, this lock is the current non-speculative instruction. When the retire queue is implemented as a FIFO structure, a magnitude compare (considering any wrap bits) of the two tags can determine whether the operation is older, younger, or equal to the current retire pointer.

If the lock instruction can be non-serially handled or its serialization requirements have been met (block 506), the lock instruction flows down a load data/status pipeline and accesses the TLB as needed for address information; data cache array for load data; cache tag array for coherency state information as shown in block 508. A MOESI coherency protocol is followed: (M-modified, O-owned, E-exclusive; S-shared; I-invalid; M and E are writeable; MOES are readable; MO are dirty; ES are clean). If the state is E or M, the load store is writable as shown in block 510. The process continues to block 512. Otherwise a request to the memory system is made for write permission. As shown by blocks 514 and 516, the pipeline requests a write permission to the L2 cache 205 and requires current cache state of the cache line from the data cache tag array to determine the type of request to make, as well as requiring address and load properties. The MAB issues a request to the L2 cache 205 which issues a request to the memory system which responds in turn. The response data and state are written to data cache/tag arrays as known in the art.

As shown in block 512, older stores that are able to be locked are identified. Part of the dispatch information captured and read from the LDQ are a pointer 224 to the STQ 204 entry that is the youngest older store relative to the lock. From this and the deallocation pointer 600 (see FIG. 6) of the STQ 204, an age mask of older stores is created. Because the SCB 206 only contains retired stores and by definition in this pipeline the lock has not yet retired, all SCB 206 entries must be older and therefore all valid entries are checked. In order to retire, stores must first complete exception checks. Only stores that have completed exception checking are eligible to be locked. They must all be in a writeable state (E or M) and must be cacheable stores. If all older stores are lockable, and no state changes are in flight due to probes, the older stores in the SCB 206 and STQ 204 are sent the indications 264 and 266 to mark their entry as locked and begin NACKing probes. Already locked stores are by definition also lockable such that many locks may add themselves and older stores to the atomic group which is done by the atomic grouping unit. This allows rapid completion of many locked operations without having to serialize them. Stated another way, identifying which of a plurality of older store instructions relative to a current lock instruction are able to be locked is based at least on cache coherency state information indicating that the older store instructions are writable, that the older store instructions are cacheable store instructions, and no state changes are in flight due to probes from other cores. It further identifies which of a plurality of store instructions are able to be locked based at least on an age mask/compare indicating which stores are older relative to a current lock instruction.

As shown in block 518, the atomic grouping unit determines if all the older stores from the STQ 204 and SCB 206 are lockable. For those that are not lockable, as shown in block 520, there are many methods possible. For example, a speculative lock retire/map operation may be used, or retrying the atomic group sequence can be employed or waiting until all the older stores have committed can be employed.

As shown in block 522, when all the older stores are lockable they are marked as locked in the SCB 206 and STQ 204. The SCB 206 and STQ 204 entries are looked up by every probe/cache eviction request by address or cache index and way and the probe is NACKed if matching a locked entry. By NACKing probe requests to a cacheline, it is said to be locked as no other core can read or write that cacheline until the line is released from this cache (after the store locking the line has written/committed).

As shown in block 524, prior to retiring, the lock returns data and status to execution (EX) unit or floating point units. The load data/status pipeline through the atomic grouping unit 210 returns completion status to the EX unit, and then it retires when it becomes the oldest unretired instruction. Meanwhile the older stores are also retiring in program order and deallocating from STQ 204 to SCB 206 and committing from SCB 206 to L1 data cache. The probe processing logic NACKs probes to the older stores in the atomic group while in the STQ 204 and SCB 206, and also while transferring their cache state/payload/locked information between queues. Finally, the locked operation at the youngest end of the atomic group will do the same.

As shown in block 526, as each locked store commits to the L1, the locked store deallocates from the SCB 206. By deallocating from the SCB 206, probes to the address will no longer be NACKed and the line is implicitly unlocked. The lock instruction at the end of the group (if there is more than one lock) will also do so.

Stated another way, the lock mechanism decision process, in one example, can be as follows: (1) if the lock is already non-speculative and older stores are drained and the cache line is writeable, the instruction completes and the cache line is locked immediately, no special mechanism is needed; (2) if the lock is the oldest load (for fencing/ordering reasons), or the load is a non-speculative load in the case of non-restartable, microcoded locks (e.g., for safety) then the process checks if the older stores all satisfy the criteria for the atomic group mechanism as described above (e.g., older stores are cacheable and in a lockable state, no inflight state changes have occurred, the process has not failed locks previously such that process (1) is enforced, if the line is not livelocked (e.g., not in a state where operations to the cache line for a thread is not making meaningful progress), and the process is not waiting on orphaned requests) and uses the atomic grouping mechanism described herein. If it is not possible to use (2), the process then (3) uses the speculative lock operation as described above. For example, for a speculative lock, a lock instruction and younger instructions are allowed to speculatively retire prior to the store portion of the lock instruction committing its value to memory. These instructions thus do not have to wait for the lock instruction to complete before retiring. In the event that the processor detects a violation of the atomic or fencing properties of the lock instruction prior to committing the value of the lock instruction, the processor rolls back state and executes the lock instruction in a slow mode in which younger instructions are not allowed to execute until the stored value of the lock instruction is committed. If it is not possible to use (3), the process (4) returns the data speculatively and waits or spins (continuously reflows) until matching conditions for process (1) exists. If reflow occurs after doing process (4), then processes (2) and (3) can be tried again.

Figure 7:
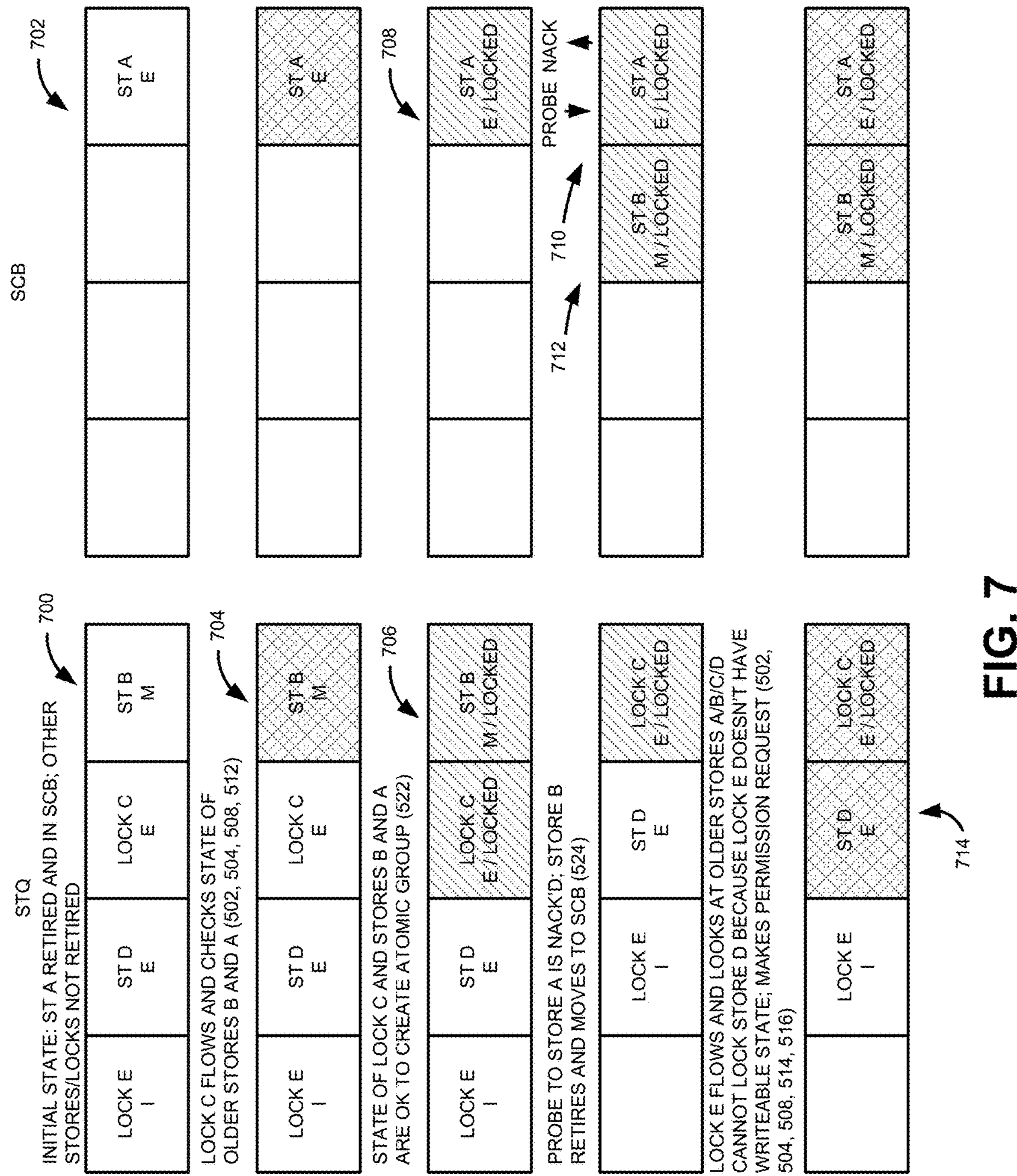
FIG. 7 is a diagram illustrating various states of lock instructions and store instructions in a store queue unit and in a post retire store queue in accordance with one example set forth in the disclosure.
Figure 8:
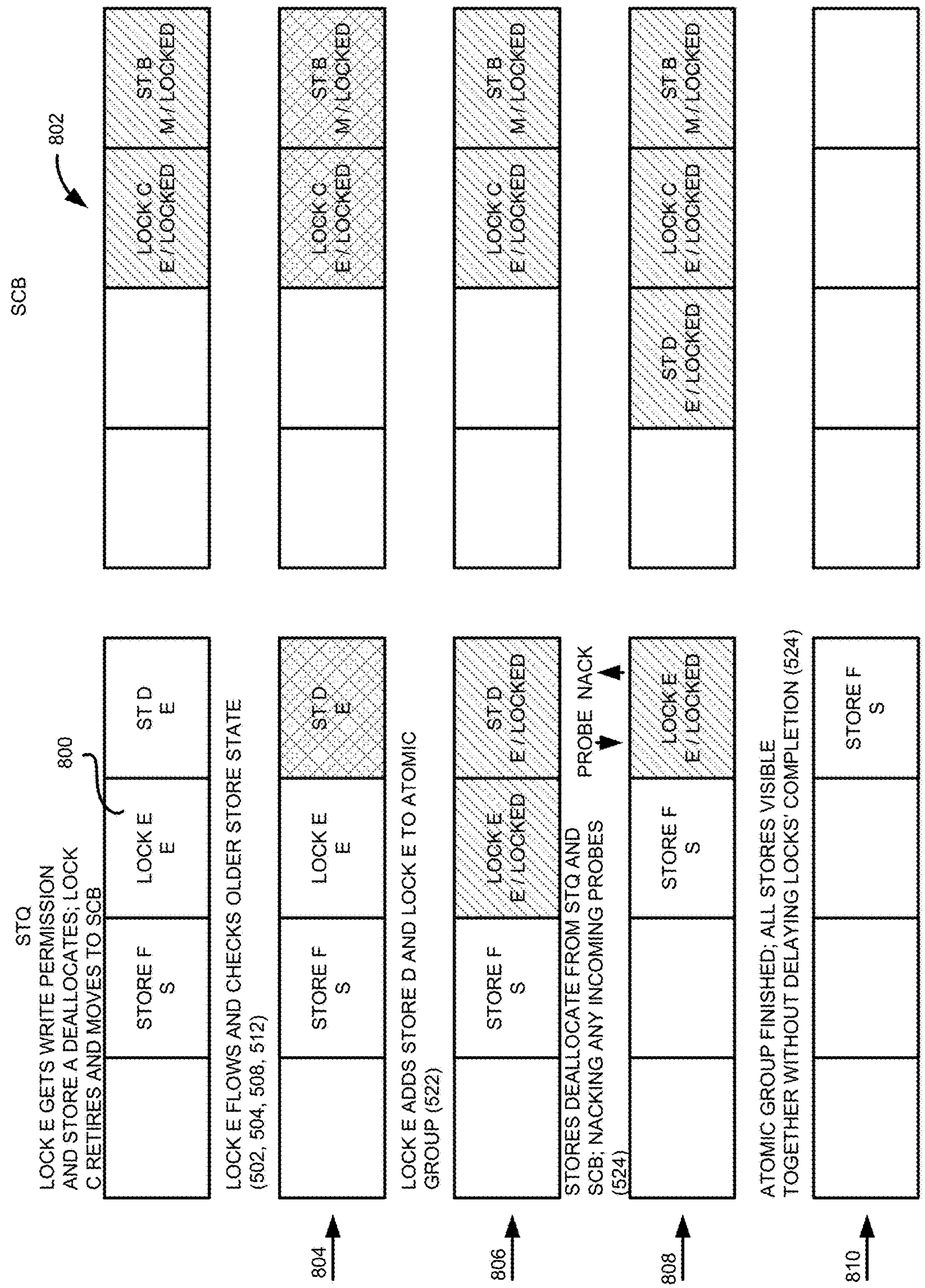
FIG. 8 is a diagram illustrating various states of lock instructions and store instructions in a store queue unit and in a post retire store queue in accordance with one example set forth in the disclosure.

FIGS. 7 and 8 illustrate data changes in the store queue unit 204 and the post retired store queue unit (SCB) 206. For purposes of illustration, the example includes, from oldest to youngest in program order, a STORE A instruction then STORE B instruction. Following STORE B is a LOCK C instruction (younger than STORE A and STORE B) followed by a STORE D instruction followed by a LOCK E instruction followed by a STORE F instruction. As shown in 700, as an initial state, STORE A is retired and in the SCB 206. This is shown in 702. The other stores and locks are not retired and are all in the STQ 204 as shown. The corresponding states are also shown such that LOCK E instruction has an INVALID (I) state, meaning that it is not writeable. However, STORE D and LOCK C instructions have EXCLUSIVE (E) state and STORE B has a MODIFIED (M) state. The E and M states are considered writable. As shown by item 704, LOCK C flows through the pipeline and checks the state of older stores B and A as previously described. The checking is shown by the hashed boxes. The processor checking the states of the older stores were described previously in connection with FIG. 5. As shown by 706, the state of the LOCK C instruction and STORES B and A are determined to be acceptable for creating an atomic group. As such, the indication that is sent by the atomic grouping unit 210 indicates that LOCK C instruction is locked in the STQ 204 as well as STORE B.

As shown by 708, the STORE A instruction in the SCB 206 is also locked. In the next row, a probe is received to store information associated with the address of the STORE A instruction as indicated generally by 710. The probe is negatively acknowledged, and the cache state remains unchanged. STORE B retires and moves to the SCB 206 as shown in 712. In the following row, another lock instruction, LOCK E is processed and looks at older STORE A, STORE B, STORE D, and LOCK C. However, LOCK E cannot lock the STORE D instruction because LOCK E does not have a writeable state. As such, LOCK E causes a write permission request to be made. This is shown by 714. The cross hatch boxes are also intended to show the locks considering their own cache state as well.

As shown by 800 (FIG. 8), the LOCK E instruction gets write permission and STORE A instruction deallocates from the SCB 206. LOCK C retires and moves from the STQ 204 to the SCB 206. This is shown as 802. LOCK E flows and checks older store states as shown by row 804. As shown in row 806, LOCK E adds the STORE D instruction and LOCK E to the atomic group which includes LOCK C instruction and STORE B instruction (this is indicated by the hashed lines). As such, the atomic grouping unit sends the indication to the STQ 204 to lock the LOCK E instruction and STORE D instruction. It is not required that LOCK C be retired/moved to the SCB before LOCK E considers it and can create an atomic group. The LOCK C could be in the STQ just as STORE D is. As shown in row 808, when a probe is received by the STQ 204, a NACK is returned for a probe against the LOCK E address. As shown in row 810, the atomic group is completed. All stores are visible together without delaying the locks' completion.

As described above, locks are completed as soon as older stores are ready to commit by grouping older stores atomically. By creating the atomic group, the group lock can be completed speculatively. The atomic group to an outside observer such as another thread or core, cannot tell if the lock was completed speculatively (it cannot see instructions out of order). The lock does not have to wait for older stores to actually write to memory before returning data to EX, completing, or retiring.

The above detailed description and the examples described therein have been presented for the purposes of illustration and description only and not for limitation. For example, the operations described are done in any suitable manner. It is therefore contemplated that the present implementations cover any and all modifications, variations or equivalents that fall within the scope of the basic underlying principles disclosed above and claimed herein. Furthermore, while the above description describes hardware in the form of a processor executing code, hardware in the form of a state machine or dedicated logic capable of producing the same effect, other structures are also contemplated.

What is claimed is:

1. A method, carried out by a processor, for handling lock instructions comprising:
- identifying which of a plurality of older store instructions relative to a current lock instruction are able to be locked;
- locking the identified older store instructions as an atomic group with the current lock instruction; and
- negatively acknowledging probes until all of the older store instructions in the atomic group have written to cache memory.

2. The method of claim 1, wherein locking the identified older stores as an atomic group comprises issuing an indication to lock identified older store instructions that are retired and lockable.

3. The method of claim 1, wherein locking the identified older stores as an atomic group comprises issuing an indication to lock non-retired and lockable older stores as instructions in the atomic group.

4. The method of claim 1, further comprising retiring and committing the atomically grouped older store instructions and the current lock instruction as a group.

5. The method of claim 1, wherein:
- identifying which of the plurality of older store instructions relative to the current lock instruction are able to be locked is based at least on:
  - cache coherency state information indicating that the older store instructions are writable;
  - that the older store instructions are cacheable store instructions; and
  - no state changes are in flight due to probes from other cores.

6. The method of claim 1, wherein identifying which of the plurality store instructions relative to the current lock instruction are older based at least on an age mask and uses the age mask to identify which of the plurality of older store instructions relative to the current lock instruction are able to be locked based at least on:
- cache coherency state information indicating that the older store instructions are writable;
- that the older store instructions are cacheable store instructions; and
- no state changes are in flight due to probes from other cores.

7. A processor, comprising:
- a cache memory;
- an atomic grouping unit, operatively coupled to the cache memory, and operative to:
  - identify which of a plurality of older store instructions relative to a current lock instruction are able to be locked; and
  - lock the identified older store instructions as an atomic group with the current lock instruction; and
- probe processing logic operative to negatively acknowledge probes until all of the older store instructions in the atomic group have written to cache memory.

8. The processor of claim 7, wherein:
- the probe processing logic comprises a post retire store queue unit; and
- the atomic grouping unit is operative to issue an indication to the post retire store queue unit to lock identified older store instructions that are retired and lockable.

9. The processor of claim 8, wherein:
- the probe processing logic further comprises a store queue unit that contains non-retired older stores determined to be lockable; and
- the atomic grouping unit is operative to issue an indication to the store queue unit to lock the identified older stores as instructions in the atomic group.

10. The processor of claim 7, wherein the atomic grouping unit is operative to retire the atomically grouped older store instructions and the current lock instruction as a group.

11. The processor of claim 7, wherein the atomic grouping unit identifies which of the plurality of older store instructions relative to the current lock instruction are able to be locked based at least on:
- cache coherency state information indicating that the older store instructions are writable;
- that the older store instructions are cacheable store instructions; and
- no state changes are in flight due to probes from other cores.

12. The processor of claim 7, wherein the atomic grouping unit identifies which of the plurality store instructions relative to the current lock instruction are older based at least on an age mask and uses the age mask to identify which of the plurality of older store instructions relative to the current lock instruction are able to be locked based at least on:
- cache coherency state information indicating that the older store instructions are writable;
- that the older store instructions are cacheable store instructions; and
- no state changes are in flight due to probes from other cores.

13. A computer system, comprising:
- a processor; and
- a memory that stores instructions for execution by the processor;
- wherein the processor comprises:
  - cache memory;
  - an atomic grouping unit, operatively coupled to the cache memory, and operative to:
    - identify which of a plurality of older store instructions relative to a current lock instruction are able to be locked; and
    - lock the identified older store instructions as an atomic group with the current lock instruction; and
  - probe processing logic operative to negatively acknowledge probes until all of the older store instructions in the atomic group have written to cache memory.

14. The computer system of claim 13, wherein:
- the probe processing logic comprises a post retire store queue unit; and
- the atomic grouping unit is operative to issue an indication to the post retire store queue unit to lock identified older store instructions that are retired and lockable.

15. The computer system of claim 14, wherein:
- the probe processing logic further comprises a store queue unit that contains non-retired older stores determined to be lockable; and
- the atomic grouping unit is operative to issue an indication to the store queue unit to lock the identified older stores as instructions in the atomic group.

16. The computer system of claim 13, wherein the atomic grouping unit is operative to retire the atomically grouped older store instructions and the current lock instruction as a group.

17. The computer system of claim 13, wherein the atomic grouping unit identifies which of the plurality of older store instructions relative to the current lock instruction are able to be locked based at least on:

cache coherency state information indicating that the older store instructions are writable;

that the older store instructions are cacheable store instructions; and no state changes are in flight due to probes from other cores.

18. The computer system of claim 13, wherein the atomic grouping unit identifies which of the plurality store instructions relative to the current lock instruction are older based at least on an age mask and uses the age mask to identify which of the plurality of older store instructions relative to the current lock instruction are able to be locked based at least on:

cache coherency state information indicating that the older store instructions are writable;

that the older store instructions are cacheable store instructions; and no state changes are in flight due to probes from other cores.

* * * * *